Feb. 1, 1927.  W. B. GROW  1,615,942
HAND TRUCK
Filed March 9, 1926
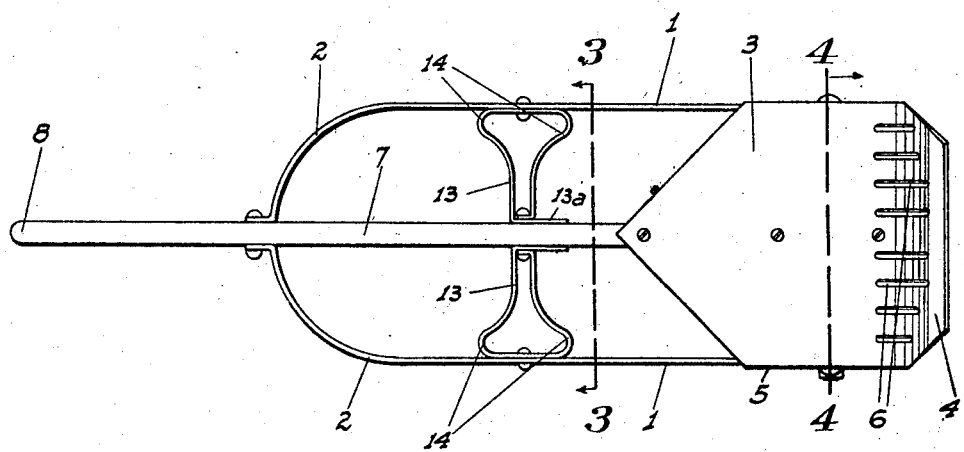
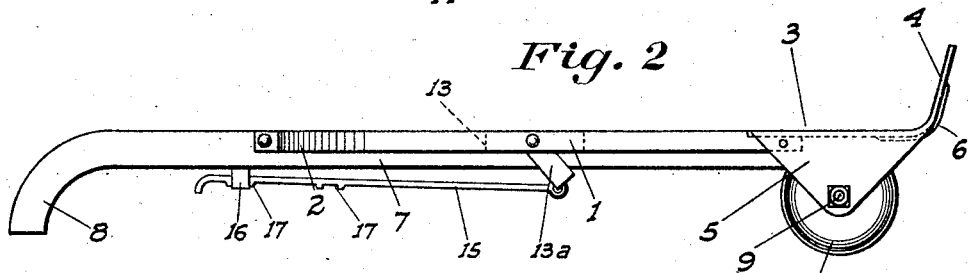
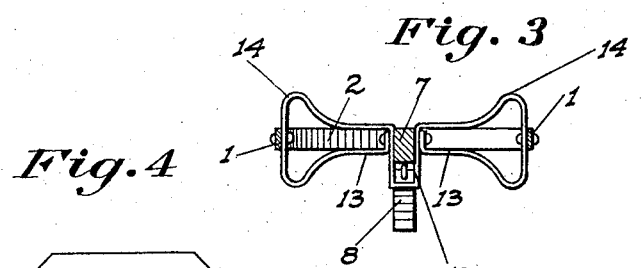
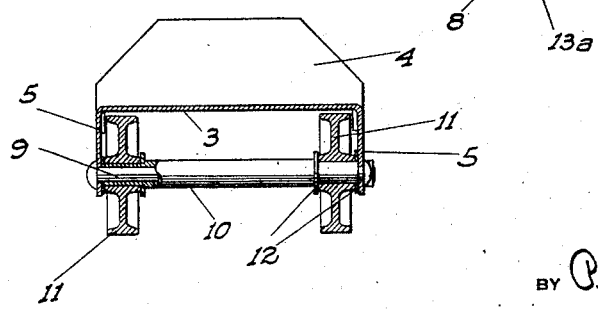
INVENTOR
*Wm. B. Grow*
BY *Perry S. Webster*
ATTORNEY Patented Feb. 1, 1927.

1,615,942

UNITED STATES PATENT OFFICE.

WILLIAM B. GROW, OF MARYSVILLE, CALIFORNIA.

HAND TRUCK.

Application filed March 9, 1926. Serial No. 93,371.

This invention relates to improvements in hand trucks for transporting boxes, barrels and the like of all kinds, such as are commonly used around railroad stations and other industrial establishments.

The principal object of my invention is to provide a truck of this general character arranged to carry either flat sided or cylindrical members with equal facility.

A further object is to construct a truck for the purpose such that it will be extremely substantial and rigid and yet of simple and inexpensive construction, as will be evident from a perusal of the following specification.

These objects I accomplish by means of such structure and relative arrangement of parts as will fully appear by a perusal of the following specification and claims.

In the drawings similar characters of reference indicate corresponding parts in the several views:

Fig. 1 is a top plan view of my improved truck.

Fig. 2 is a side elevation of the truck.

Fig. 3 is a cross section on the line 3—3 of Fig. 1.

Fig. 4 is a cross section on the line 4—4 of Fig. 1.

Referring now more particularly to the characters of reference on the drawings, the numeral 1 denotes a pair of transversely spaced frame members preferably made of heavy scrap-iron and curving toward each other at their rear ends, as shown at 2. Extending across and rigidly secured to the frames 1 at their forward ends is a load supporting platform 3 in the form of a flat plate of heavy sheet metal, provided with an integrally formed upwardly projecting flange or apron 4 at its forward end, and with side members 5 projecting downwardly outside the frames 1. The platform and apron are preferably formed with longitudinally extending ribs 6 therebetween to strengthen the apron and prevent any tendency of the same to flatten down or straighten out under the weight of a load.

A single centrally disposed tongue 7 extends rearwardly from under the rear end of the platform to and beyond the rear ends of the frames 1, the latter at such ends being rigidly secured to the opposite sides of the tongue. Beyond the frames the tongue is bent down to serve as a handle 8 and also as a ground bearing support for the frames.

The side members 5 serve as bearings as supports for a shaft-bolt 9 which passes through a sleeve 10 extending between said members 5 and held thereagainst by said bolt. Wheels 11 are turnable on the sleeve adjacent the members 5, being prevented from lateral movement relative to said sleeve by washers or collars 12 thereon.

Extending between the frame members 1 and the central tongue 7 are transversely alined cradles 13, which are turnably mounted to said tongue and frames, the axis of said cradles extending transversely of the frames. The cradles are connected to each other under the beam 7 by a transverse member 13ª and are so shaped that when turned in one direction they lie flat and substantially in a common plane with the frames and tongue so as not to project thereabove. When however the cradles are turned through a 90 degree arc in either direction from such flat position, they present oppositely disposed and upwardly projecting concave shoulders 14 adjacent the frames 1, as shown in Fig. 3. The cradles are preferably formed of stout scrap-iron bent to the proper shape, this material lending itself readily to the necessary bending operations, and being relatively light for its strength. When therefore the cradles are turned to assume a position as shown in Fig. 3, a barrel or the like may be supported on the truck with its axis extending longitudinally of the truck and will then be prevented from rolling off sideways. To enable the cradles to be readily manipulated from the handle end of the beam 7, I may apply a horizontal pull rod 15 to the member 13ª, which rod extends rearwardly toward the handle 8 and passes through a guide 16, spaced catches 17 being provided on the rod, for engagement with the guide 16 to prevent undesired movement of the cradles. If flat-sided boxes or the like only are to be carried both cradles are to be turned down, the cradles then aiding in supporting any boxes which project rearwardly of the platform, and of course prevent such boxes from dropping between the frames and tongue.

The depth of the handle 8 relative to the diameter of the wheels is preferably such that when the handle is resting on the ground the frames 1 are horizontally disposed and the need of additional supporting legs for the truck, to maintain the same in such horizontal position, is therefore eliminated.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A hand truck including transversely spaced side frames, and cradles turnably mounted and extending transversely between the frames; said cradles having opposed shoulders to project upwardly when said cradles are turned in one direction; the cradles when turned through a 90 degree arc from such position being flat and lying in a common plane with the top of the frames, whereby to then act in conjunction with the frames for supporting a load.

2. A hand truck including transversely spaced side frames, a central beam extending lengthwise of and between the frames, and cradles turnably mounted on the beam and frames and extending between the adjacent faces of the beam and frames.

3. A hand truck including transversely spaced side frames, a central beam extending lengthwise of and between the frames, cradles turnably mounted on the beam and frames and extending between the adjacent faces of the beam and frames, and a rigid connection between the cradles formed integral therewith at the adjacent ends thereof and depending under the beam.

In testimony whereof I affix my signature.

WILLIAM B. GROW.